(12) United States Patent
Taylor et al.

(10) Patent No.: US 10,888,783 B2
(45) Date of Patent: Jan. 12, 2021

(54) DYNAMIC MODIFICATION OF AUDIO PLAYBACK IN GAMES

(71) Applicant: Sony Interactive Entertainment Inc., Tokyo (JP)

(72) Inventors: Michael Taylor, San Mateo, CA (US); Glenn Black, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/710,733

(22) Filed: Sep. 20, 2017

(65) Prior Publication Data
US 2019/0083886 A1 Mar. 21, 2019

(51) Int. Cl.
*A63F 9/24* (2006.01)
*A63F 11/00* (2006.01)
*G06F 13/00* (2006.01)
*G06F 17/00* (2019.01)
*A63F 13/54* (2014.01)
*A63F 13/60* (2014.01)
*A63F 13/67* (2014.01)

(52) U.S. Cl.
CPC ............ *A63F 13/54* (2014.09); *A63F 13/60* (2014.09); *A63F 13/67* (2014.09); *A63F 2300/6009* (2013.01); *A63F 2300/6081* (2013.01)

(58) Field of Classification Search
CPC .................. G10H 2210/026; G10H 2210/021
USPC ........................ 463/1, 10, 20, 39, 40, 42, 43
See application file for complete search history.

(56) References Cited

U.S. PATENT DOCUMENTS

| | | |
|---|---|---|
| 5,987,415 A | 11/1999 | Breese et al. |
| 6,324,511 B1 | 11/2001 | Kiraly et al. |
| 6,334,104 B1 | 12/2001 | Hirai |
| 6,728,679 B1 | 4/2004 | Strubbe et al. |
| 6,816,577 B2 | 11/2004 | Logan |
| 6,975,988 B1 | 12/2005 | Roth et al. |
| 7,003,515 B1* | 2/2006 | Glaser ............... G06F 17/30743 707/723 |
| 7,644,000 B1 | 1/2010 | Strom |
| 7,663,045 B2* | 2/2010 | Schmidt .................. A63F 13/10 463/35 |
| 8,965,460 B1 | 2/2015 | Rao et al. |
| 9,253,560 B2 | 2/2016 | Goldstein et al. |
| 9,563,268 B2* | 2/2017 | Smith ..................... G06F 3/011 |
| 10,242,674 B2 | 3/2019 | Black |
| 10,661,175 B2 | 5/2020 | Taylor et al. |

(Continued)

*Primary Examiner* — Adetokunbo O Torimiro
(74) *Attorney, Agent, or Firm* — Carr & Ferrell LLP

(57) ABSTRACT

A method for dynamically modifying audio playback of a video game is provided. The method includes ascertaining a game music data associated with the video game. The game music data may include a plurality of game soundtracks classified according to predetermined criteria. The method may include collecting feedback over a period of time while the user is playing the video game. The method may continue with determining, based on the feedback, one or more replacement soundtracks based on criteria associated with the one or more replacement soundtracks. The method may further include dynamically modifying the game music data while the user is playing the video game by replacing at least one of the plurality of game soundtracks with the one or more replacement soundtracks to obtain modified game music data. The modified game music data may be provided to the user while the user is playing the video game.

22 Claims, 4 Drawing Sheets

(56) References Cited

U.S. PATENT DOCUMENTS

| | | | |
|---|---|---|---|
| 2001/0035087 A1* | 11/2001 | Subotnick | G10H 1/0008 84/600 |
| 2002/0191757 A1 | 12/2002 | Belrose | |
| 2003/0227473 A1* | 12/2003 | Shih | A63F 13/10 715/716 |
| 2004/0005923 A1* | 1/2004 | Allard | A63F 13/10 463/35 |
| 2004/0193420 A1 | 9/2004 | Kennewick et al. | |
| 2005/0033657 A1* | 2/2005 | Herrington | G06F 17/30058 705/26.7 |
| 2005/0045025 A1* | 3/2005 | Wells | A63F 13/12 84/615 |
| 2005/0051021 A1* | 3/2005 | Laakso | G07F 17/32 84/615 |
| 2006/0143236 A1 | 6/2006 | Wu | |
| 2006/0212444 A1* | 9/2006 | Handman | G06F 17/30017 |
| 2007/0021145 A1 | 1/2007 | Lam | |
| 2007/0068367 A1* | 3/2007 | Schmidt | A63F 13/10 84/600 |
| 2009/0192637 A1 | 7/2009 | Picunko et al. | |
| 2010/0069148 A1 | 3/2010 | Cargill | |
| 2013/0023343 A1* | 1/2013 | Schmidt | A63F 13/54 463/35 |
| 2013/0030814 A1 | 1/2013 | Rajput et al. | |
| 2013/0185291 A1* | 7/2013 | Tyndall | G06F 17/30598 707/723 |
| 2014/0018153 A1* | 1/2014 | Nelson | G07F 17/3223 463/25 |
| 2014/0207811 A1* | 7/2014 | Kim | H04N 21/44204 707/758 |
| 2014/0258858 A1 | 9/2014 | Hwang | |
| 2015/0106718 A1* | 4/2015 | Boulter | G06F 17/30761 715/716 |
| 2015/0378667 A1* | 12/2015 | Ridihalgh | G06F 3/165 715/716 |
| 2016/0092936 A1* | 3/2016 | Bharath | G06Q 30/0276 705/14.66 |
| 2017/0034596 A1* | 2/2017 | Newell | G11B 27/32 |
| 2017/0154109 A1* | 6/2017 | Lynch | G06Q 30/02 |
| 2019/0057688 A1 | 2/2019 | Black | |
| 2019/0091576 A1 | 3/2019 | Taylor et al. | |
| 2019/0347956 A1* | 11/2019 | Daga | G09B 19/0038 |

* cited by examiner

DYNAMIC MODIFICATION OF AUDIO PLAYBACK IN GAMES

CROSS-REFERENCE TO RELATED APPLICATIONS

This application is related to U.S. Pat. No. 10,661,175, issued May 26, 2020, entitled "Intelligent User-based Game Soundtrack", the disclosure of which is incorporated herein by reference.

BACKGROUND

Technical Field

This disclosure generally relates to computer games and entertainment applications. More particularly, this disclosure relates to intelligently modifying audio playback of a game while a user is playing the game.

Background

Conventionally, a video or computer game played by a user is accompanied by one or more game soundtracks to enhance the user's gaming experience. The one or more game soundtracks can be predetermined for a particular game by game developers. The one or more game soundtracks can be predetermined based on actions taken by the user while playing the game. For example, the one or more game soundtracks can be provided according to rules set by the game developers and cannot be modified by the user. However, the one or more game soundtracks may not be a good fit for a particular user (e.g., the game soundtracks may be repetitive, not appealing to the taste of the particular user, or may even negatively affect the performance of the user). Furthermore, a user is conventionally unable to provide any explicit feedback as to whether the currently played game soundtrack is satisfactory to the user. In addition, conventionally, no determination as to the effect of the soundtrack on the user is made.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

In one example embodiment of this disclosure, there is provided a method for dynamically modifying audio playback of a video game. The method may commence with ascertaining game music data associated with the video game. The game music data may include a plurality of game soundtracks classified according to predetermined criteria. The method may include collecting feedback over a period of time while the user is playing the video game. The method may continue with determining, based on the feedback, one or more replacement soundtracks based on criteria associated with the one or more replacement soundtracks. The method may further include dynamically modifying the game music data while the user is playing the video game by replacing at least one of the plurality of game soundtracks with the one or more replacement soundtracks to obtain modified game music data. The modified game music data may be provided to the user while the user is playing the video game.

In another embodiment of this disclosure, there is provided a system for dynamically modifying audio playback of a video game. The system may include a processor, a collection unit, an analyzing unit, and a memory storing a processor-executable code. The processor may be configured to ascertain a game music data associated with the video game. The game music data may include a plurality of game soundtracks classified according to predetermined criteria. The collection unit may be configured to collect feedback over a period of time while the user is playing the video game. The analyzing unit may be configured to determine, based on the feedback, the one or more replacement soundtracks based on criteria associated with the one or more replacement soundtracks. The processor may be further configured to dynamically modify the game music data while the user is playing the video game by replacing at least one of the plurality of game soundtracks with one or more replacement soundtracks to obtain modified game music data. The modified game music data may be provided to the user while the user is playing the video game.

In yet another embodiment of this disclosure, there is provided a non-transitory processor-readable medium having instructions stored thereon, which, when executed by a processor, cause the processor to implement the above-outlined method for dynamically modifying audio playback of a video game.

Additional novel features of example embodiments are set forth in the detailed description, which follows, and can be apparent to those skilled in the art upon examination of the following description and the accompanying drawings or may be learned by production or operation of the examples. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

Figure 1:
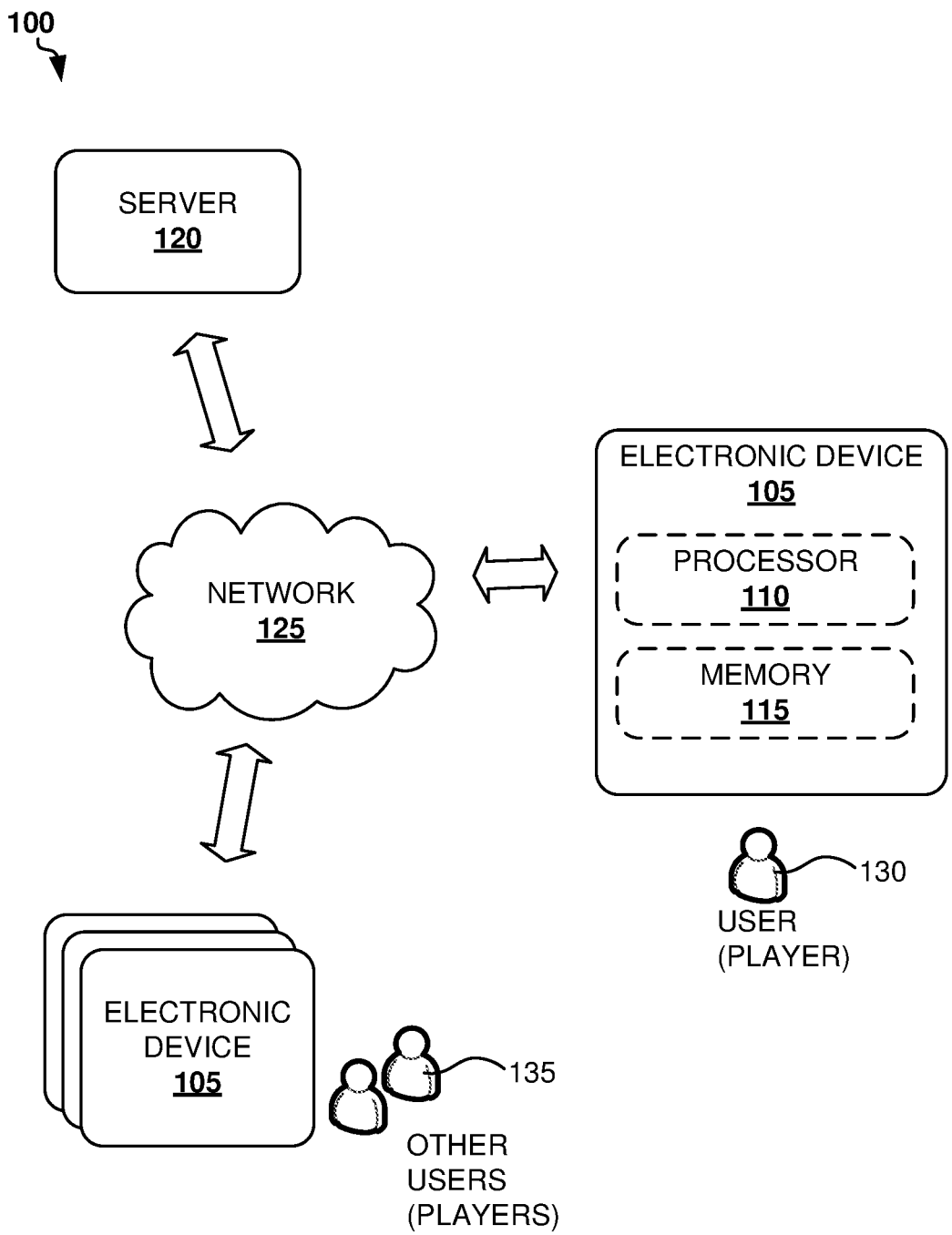
FIG. 1 shows an example system architecture for dynamically modifying audio playback of a video game, according to one embodiment.

Like reference characters indicate similar components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the disclosure. In addition, common but well-understood elements that are useful or common in a commercially feasible embodiment are often not depicted in order to facilitate a less obstructed view of these various embodiments of the disclosure.

DETAILED DESCRIPTION OF EXAMPLE EMBODIMENTS

In the following description, numerous specific details are set forth in order to provide a thorough understanding of the presented concepts. It should be understood, however, that the presented concepts may be practiced without some or all of these specific details. In other instances, well-known process operations have not been described in detail so as to not unnecessarily obscure the described concepts. While some concepts will be described in conjunction with the specific embodiments, it will be understood that these embodiments are not intended to be limiting.

The disclosure is generally directed to a technology for intelligently and dynamically modifying at least a portion of audio playback of a video game. Overall, the technology is directed to enhancing gaming experience and to addressing drawbacks known in the art. The disclosed technology is applicable to computer and video games, including online games, network games, mobile games, multiplayer games, virtual reality games, and the like, which are collectively referred to herein as games or video games. The technology can be implemented by a computing device, a gaming device, a cell phone, a server, and so forth.

When a user plays a game, such as an online game, a network game, a mobile game, a multiplayer game, a virtual reality game, and the like, game music may be provided to the user to enhance gaming experience of the user. The game music may include at least one game soundtrack provided by developers of the game, and may be played in the game according to rules predefined by the game developers. A system for dynamically modifying audio playback of a video game of the present disclosure may ascertain data associated with the game soundtrack of the game (for example, in a form of metadata of the game soundtrack). The ascertained data may be analyzed to extract audio parameters of the game soundtrack. The ascertained data may be classified based on audio parameters of the game soundtrack.

The audio parameters can include one or more of the following: a beats-per-minute (BPM) value, a tonality value, a pitch value, a timbre value, a harmonics value, a loudness value, a rhythm value, a sound envelope, a music genre, a release date, an emotional classification, and so forth. The emotional classification (e.g., aggressive, mellow, calm, melancholic, joyful, etc.) of the game soundtrack can be determined based on the analysis of the audio parameters. In some implementations, a machine learning system can be used to classify the game soundtrack. The machine learning system can be trained based on historical user data such as prior music classification. As such, the emotional classification can indicate that the game soundtrack (or a certain portion of the game soundtrack) is associated with one of predefined emotional states, such as happiness, sadness, joy, wonder, surprise, fear, anxiety, violence, anger, sorrow, disgust, distress, and so forth.

Moreover, the system of the present disclosure may collect feedback while the user is playing the game. In an example embodiment, the feedback includes an express action of the user (e.g., pressing a "like" button by the user to show that a specific game soundtrack currently played in the game is satisfactory to the user), evaluation of game results (e.g., the user achieves better results in the game when a game soundtrack having an "aggressive" emotional classification is played), performance of the user in the game (e.g., the user is less prone to error when one or more game soundtracks added by the user into a preferred list is played), an emotional state of the user (e.g., the user appears more satisfied when a game soundtrack having a "mellow" emotional classification is played), and the like. The one or more game soundtracks may be further classified based on the feedback.

The system of the present disclosure may also access a database, such as a music library, a music online service, music stored on a computer of the user, and the like. The database may have a number of soundtracks. The system may classify the soundtracks stored in the database based on audio parameters of the soundtracks. The audio parameters may also include the emotional classification of the soundtracks that can be determined based on the analysis of the audio parameters. In some embodiments, the analysis of the soundtracks in the database may be preliminarily performed so that the soundtracks may already be classified when the user starts playing the game.

The game music may be modified by replacing at least a portion of the game soundtrack with the soundtrack stored in the database. The replacement may be performed based on matching the audio parameters and the classification of the game soundtrack with the audio parameters and the classification of the soundtrack stored in the database. The replacement of game soundtracks or portions of the game soundtracks may be performed dynamically while the user is playing the game based on the feedback continuously collected during a gameplay of the user.

The following detailed description of embodiments includes references to the accompanying drawings, which form a part of the detailed description. Approaches described in this section are not prior art to the claims and are not admitted to be prior art by inclusion in this section. Reference throughout this specification to "one embodiment," "an embodiment," "some embodiments," "some implementations" or similar language means that a particular feature, structure, or characteristic described in connection with an example implementation is included in at least one embodiment of the disclosure. Thus, appearances of the phrases "in one embodiment," "in an embodiment," "in some embodiments," and similar language throughout this specification may, but do not necessarily, all refer to the same embodiment.

Furthermore, the described features, structures, or characteristics of embodiments may be combined in any suitable manner in one or more implementations. In the instant description, numerous specific details are provided, such as examples of programming, software modules, user selections, network transactions, hardware modules, hardware circuits, hardware chips, and so forth, to provide a thorough understanding of embodiments. One skilled in the relevant art will recognize, however, that the embodiments can be practiced without one or more of the specific details, or with other methods, components, materials, and so forth. In other instances, well-known structures, materials, or operations are not shown or described in detail to avoid obscuring aspects of the disclosure.

Embodiments of this disclosure will now be presented with reference to accompanying drawings which show blocks, components, circuits, steps, operations, processes, algorithms, and the like, collectively referred to as "elements" for simplicity. These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, Central Processing Units, digital signal processors, field programmable gate arrays, programmable logic devices, state machines, gated logic, discrete hardware circuits, and other suitable hardware configured to perform various functions described throughout this disclosure. One or more processors in the processing system may execute software, firmware, or middleware (collectively referred to as "software"). The term "software" shall be construed broadly to mean processor-executable instructions, instruction sets, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise.

Accordingly, in one or more embodiments, the functions described herein may be implemented in hardware, software, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM, compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

The terms "game" and "video game" can be construed to mean a computerized game, a computer game, a network game, an online game, a multiplayer game, a virtual reality game, a game for mobile devices, and the like. The terms "user" and "player" can be used interchangeably and mean a person who plays a game, and also uses or participates in providing audio playback as described herein. The term "soundtrack" should be construed to mean a sound, music, melody, song, sound clip, or any combinations thereof.

Referring now to the drawings, example embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 shows an example system architecture 100 for dynamically modifying audio playback of a video game, according to one example embodiment. System architecture 100 can include an electronic device 105 such as a game console, gaming device, computing device, mobile device, cellular phone, smart phone, tablet computer, desktop computer, laptop computer, workstation, multimedia device, television device, smart television device, and the like. As such, electronic device 105 may include input and output devices (not shown) to enable a user 130 (also referred to herein a player) to play games (i.e., computer games). For example, electronic device 105 may include at least one speaker (not shown) configured to output (play) various sounds such as game soundtracks and modified game music data generated by a method for dynamically modifying audio playback of a video game as described herein.

Electronic device 105 may also include a processor 110 and a memory 115. Memory 115 can store processor-executable instructions for execution by processor 110. Memory 115 can also store data associated with one or more games or gaming applications, one or more game soundtracks, one or more user settings or preferences, and so forth. The processor-executable instructions can cause processor 110 to implement at least some operations of the methods for dynamically modifying audio playback of a video game as disclosed herein. Electronic device 105 may further include a user interface (not shown), such as a graphical user interface, enabling the user 130 to interact with the game, activate or deactivate the method for dynamically modifying audio playback of a video game, adjust settings associated with modification of game soundtracks and displaying identifiers associated with currently played game soundtracks, and the like.

In some embodiments, the game can be an online game, network game, or multiplayer game. Accordingly, electronic device 105 of the user 130 can be operatively connected to one or more servers 120 or electronic devices 105 of other users 135 via a communications network shown as a network 125. The network 125 can refer to any wired, wireless, or optical networks including, for example, the Internet, intranet, local area network, Personal Area Network, Wide Area Network, Virtual Private Network, cellular phone networks (e.g., packet switching communications network, circuit switching communications network), Bluetooth radio, Ethernet network, an IEEE 802.11-based radio frequency network, Internet protocol communications network, or any other data communication network utilizing physical layers, link layer capability, or network layer to carry data packets, or any combinations of the above-listed data networks.

In some implementations, server 120 can implement some or all operations of the method for dynamically modifying audio playback of a video game as described herein. For example, electronic device 105 can allow the user 130 to play a game which generates game music, while server 120 can perform some or all operations for dynamically modifying game music data by replacing at least one of a game soundtrack with the one or more replacement soundtracks, and cause electronic device 105 to play modified game music data while the user 130 is playing the game. In other implementations, all operations of the method for dynamically modifying audio playback of a video game can be implemented by electronic device 105. However, it is not necessary that electronic device 105 is incorporated into a single housing. Rather, in some implementations, electronic device 105 can include several units. For example, processor 110 and memory 115 can be incorporated into a game console, while speakers for presenting the replacement game soundtracks can be incorporated into a television set, and the game console and the television set can be operatively connected to one another.

Figure 2:
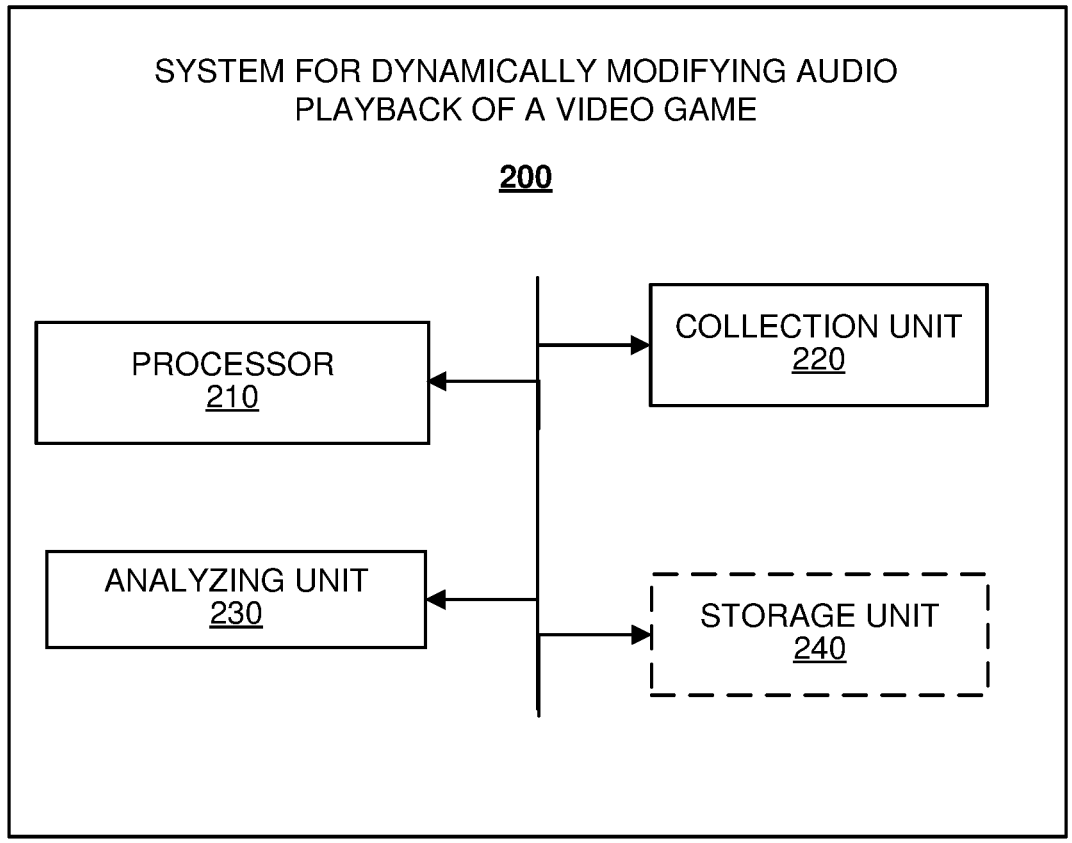
FIG. 2 is a schematic representation of elements of a system for dynamically modifying audio playback of a video game, according to an example embodiment.

FIG. 2 is a schematic representation of elements of a system 200 for dynamically modifying audio playback of a video game, according to an example embodiment. The system 200 may comprise a processor 210, a collection unit 220, an analyzing unit 230, and optionally, a storage unit 240, also referred to herein as a memory. The processor 210 may be configured to ascertain a game music data associated with the video game. The game music data may include a plurality of game soundtracks classified according to predetermined criteria. The game music data may be ascertained in a form of metadata of the game soundtracks. The metadata may include at least the audio parameters of the game soundtracks.

The collection unit 220 may be configured to collect feedback over a period of time while the user is playing the video game. In an example embodiment, the feedback may include one or more of the following: an express action of the user, evaluation of game results, an emotional state of the user, and so forth. The emotional state of the user may include one or more of the following: a biometrical response, a facial expression, a facial motion, a stress level of the user, and so forth. The express action may include pressing a "like" button, pressing a "thumbs up" button, pressing a "thumbs down" button, enabling a pop-up (where the pop-up may show at least a title of a song provided to the user in the modified game music data), disabling the pop-up, and so forth. In an example embodiment, the stress level of the user may be identified based on user vital parameters or user motions. In other words, the stress level of the user may be attributed to a specific game soundtrack, the game soundtrack may be associated with a specific type of a biomedical response of the user, an emotional state of the user may be attributed to a specific game soundtrack, and the like. The game soundtrack may be classified based on the audio parameters and the feedback.

In some example embodiments, the classification of the game soundtrack may include the emotional classification. The emotional classification of the game soundtrack can be determined based on the audio parameters, game music data (metadata), gameplay, game content, language associated with gameplay (e.g., conversations of virtual characters), in-game sound triggers, and so forth.

The analyzing unit 230 may be configured to determine, based on the feedback, the one or more replacement soundtracks based on criteria associated with the one or more replacement soundtracks. Specifically, the replacement soundtracks may be obtained from a music source, such as a music library, a music online service, a cloud-based music service, a cloud-based music storage, music files stored on a computer of the user, and so forth. The music source may include a plurality of soundtracks that may be used as replacement soundtracks for the video game. The analyzing unit 230 may access the music source. The music source can include music files or logs (identifiers, indexes) of music files that may be used as replacement soundtracks. The analyzing unit 230 may determine audio parameters for each of the one or more replacement soundtracks. The audio parameters may include a BPM value, a tonality value, a pitch value, a timbre value, a harmonics value, a loudness value, a rhythm value, a sound envelope, a music genre, a release date, an emotional classification, and so forth.

The analyzing unit 230 may further classify the one or more replacement soundtracks based on the audio parameters. The analyzing unit 230 may further index the one or more replacement soundtracks based on the classifying to provide replacement soundtrack indexes. The replacement soundtrack indexes may be used to match a classification of the one or more replacement soundtracks with a classification of the plurality of game soundtracks. The classification of each of the plurality of game soundtracks and the classification of the one or more replacement soundtracks may be determined by a machine learning system. The machine learning system may be trained based on historical user data stored in the historical data database. In some example embodiments, the classification of the replacement soundtracks may include the emotional classification based on the audio parameters of the replacement soundtracks.

Generally speaking, once the feedback associated with the game soundtracks played in the game is obtained, the replacement soundtracks are analyzed so as to match the classification of the game soundtracks and the classification of the replacement soundtracks. In other words, the music source may store one or more replacement soundtracks having the classification that matches the classification of a certain game soundtrack (or a portion of the game soundtrack). For example, when the classification of a certain game soundtrack is a song having a "sorrowful" emotional characteristic, the analyzing unit 230 may select one or more songs (i.e., replacement soundtracks) from the music source that possess same or similar characteristics.

As such, the system 200 can analyze replacement soundtracks of the music source similarly to the analysis of the game soundtracks. In other words, each replacement soundtrack can be analyzed to extract audio parameters (e.g., a BPM value, a tonality value, a pitch value, a timbre value, a harmonics value, a loudness value, a rhythm value, a sound envelope, a music genre, a release date, and so forth) to determine the emotional classification of the replacement soundtracks based on the analysis of the audio parameters. The emotional classifications can be further used to index the replacement soundtracks.

The processor 210 may be configured to dynamically modify the game music data while the user is playing the video game. The modification may be performed by replacing at least one of the plurality of game soundtracks or a portion of the game soundtrack with one or more replacement soundtracks or a portion of the replacement soundtrack to obtain modified game music data.

The processor 210 may be configured to provide the modified game music data to the user while the user is playing the video game. The modified game music data provided based on the feedback collected while the user is playing the game may help to improve the performance of the user, as well as the emotional state of the user, and may result in better satisfaction of the user with the gameplay.

It should be noted that the user may not always know which replacement soundtrack is currently playing. Therefore, the user may desire to make inquiries concerning a title or a musician name performing a particular replacement soundtrack. For these reasons, the processor 210 may be configured to temporarily display, within the video game, via a graphical user interface of an electronic device, an identifier of the replacement soundtrack used to replace the game soundtrack. The identifier can include, for example, a soundtrack title and a name of musician.

In an example embodiment, the processor 210 may be configured to store the feedback to a historical data database. The historical data database may store a plurality of feedback associated with a plurality of users collected while each of the plurality of users is playing the video game. In an example embodiment, the historical data database may be stored in the storage unit 240.

In a further example embodiment, the processor 210 may be further configured to search in a historical data database for one or more users having parameters similar to parameters of the user. The processor 210 may select one or more game soundtracks recommended or preferred by the one or more users. In this example embodiment, the dynamic modification of the game music data may further include replacing at least one of the plurality of game soundtracks with the one or more game soundtracks recommended or preferred by the one or more users.

In an example embodiment, the processor 210 may be configured to identify sound triggers based on a gameplay of the video game, actions of the user in the video game, or actions of further users in the video game. The replacement of the at least one of the plurality game soundtracks with the one or more replacement soundtracks may be performed at times associated with the sound triggers. In some embodiments, the replacement means that the game soundtrack is effectively muted, and the selected replacement soundtrack is provided instead of the muted game soundtrack.

It should be noted that the process of replacing game soundtracks with replacement soundtracks is performed in real-time. Moreover, the replacement can be performed selectively meaning that only certain portions of game soundtrack are replaced with replacement soundtracks. For example, the system 200 can identify predefined sound triggers based on a gameplay of the user, actions of the user in the game, or actions of other users in the game that can be obtained from the historical data database, and replace the game soundtrack with the replacement soundtrack at times associated with sound triggers.

The replacement of game soundtracks with replacement soundtracks can be "seamless" to the user. To this end, the system 200 can intelligently mix one or more game soundtracks (which are not replaced or muted) with one or more replacement soundtracks (which are used to replace certain game soundtracks) such that a transition between these soundtracks is blended. For example, the transition may involve matching BPM values of the game soundtrack and the replacement soundtrack, followed by fading in and fading out of the soundtracks.

Furthermore, the processor 210 can prioritize some replacement soundtracks in the music source based on the feedback associated with actions of the user collected in association with the replacement soundtracks. For example, the processor 210 can prioritize replacement soundtracks recently played in the game, or replacement soundtracks recently added by the user to a wish list. In other embodiments, the processor 210 can determine user music preferences based on a frequency of playing the replacement soundtracks and prioritize the replacement soundtracks accordingly. As such, the replacement of a game soundtrack can be performed with a replacement soundtrack that has a higher priority for the user than other replacement soundtracks.

Figure 3:
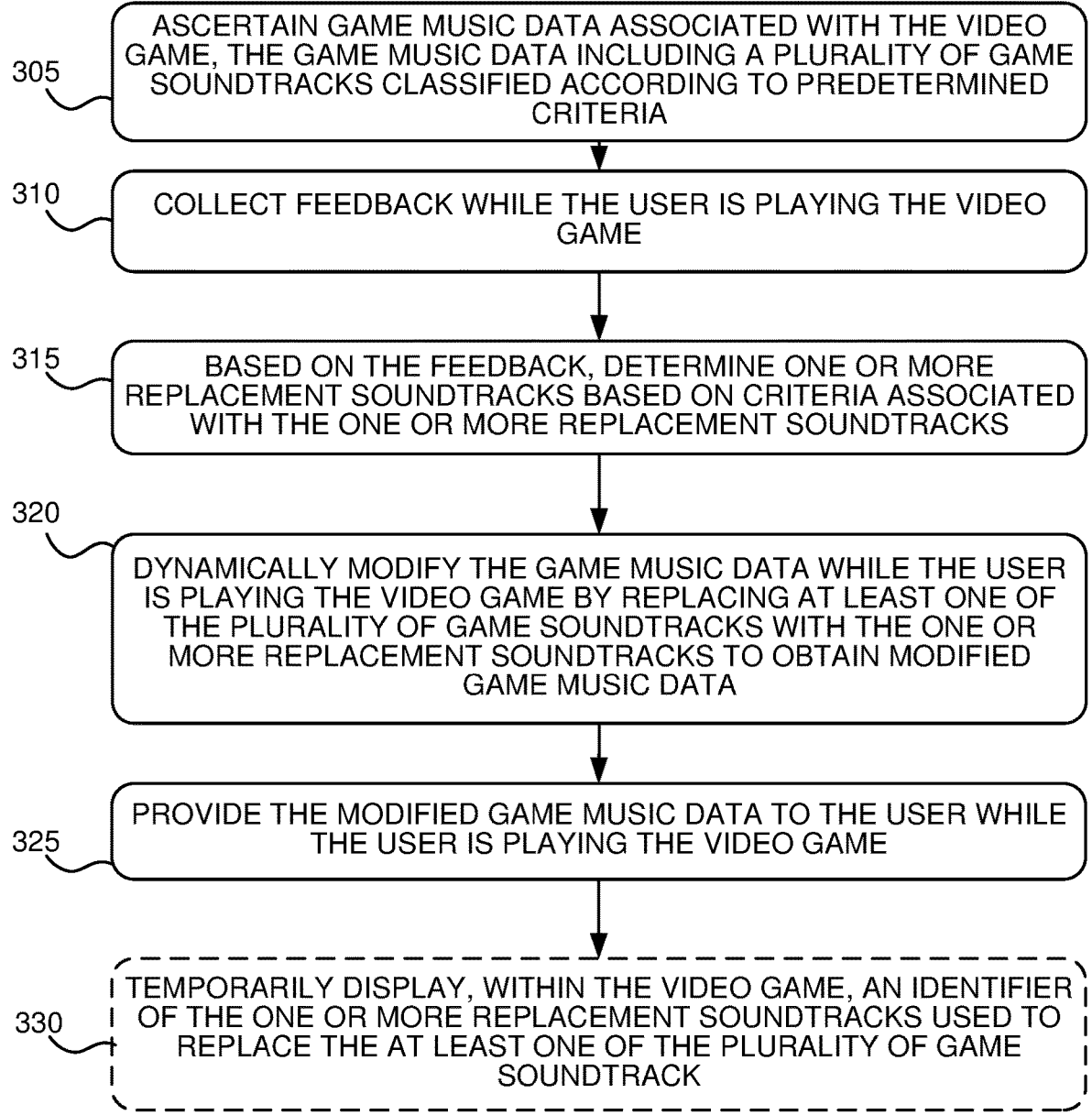
FIG. 3 shows a process flow diagram illustrating a method for dynamically modifying audio playback of a video game, according to an example embodiment.

FIG. 3 is a process flow diagram showing a method 300 for dynamically modifying audio playback of a video game, according to an example embodiment. The method 300 can be performed by processing logic that includes hardware (e.g., decision-making logic, dedicated logic, programmable logic, application-specific integrated circuit), software (such as software run on a general-purpose computer system or a dedicated machine), or a combination of both. In one example embodiment, the processing logic refers to one or more elements of electronic device 105 of FIG. 1. Operations of method 300 recited below can be implemented in an order different than described and shown in the figure. Moreover, method 300 may have additional operations not shown herein, but which can be evident to those skilled in the art from the disclosure. The method 300 may also have fewer operations than shown in FIG. 3 and described below.

The method 300 may commence with ascertaining game music data associated with the video game at operation 305. The game music data may include a plurality of game soundtracks classified according to predetermined criteria. The video game can be implemented by an electronic device, a server, or both to allow the user to play the game. For example, the video can include a computerized game, video game, network game, multiplayer game, or an online game. The game soundtracks can be predefined by game developers.

At operation 310, feedback may be collected over a period of time while the user is playing the video game. In an example embodiment, the feedback may include one or more of the following: an express action of the user, evaluation of game results, an emotional state of the user, and so forth. The express action of the user may include pressing a "like" button, pressing a "thumbs up" button, pressing a "thumbs down" button, enabling a pop-up (in which the pop-up shows at least a title of a song provided to the user in the modified game music data), and disabling the pop-up. The emotional state of the user may include a biometrical response, a facial expression, a facial motion, a stress level, and the like. The stress level of the user may be identified based on user vital parameters or user motions.

The feedback may be stored to a historical data database. The historical data database may store a plurality of feedback associated with a plurality of users collected while each of the plurality of users is playing the video game.

The method 300 may continue with determining, based on the feedback, one or more replacement soundtracks based on criteria associated with the one or more replacement soundtracks at operation 315. In an example embodiment, the one or more replacement soundtracks may be determined as follows. The method 300 may include accessing a music source that may incorporate a plurality of soundtracks that can be used as replacement soundtracks. Audio parameters for each of the one or more replacement soundtracks may be determined. The one or more replacement soundtracks may be classified based on the audio parameters. The one or more replacement soundtracks may be indexed based on the classifying to provide replacement soundtrack indexes. The replacement soundtrack indexes may be used to match a classification of the one or more replacement soundtracks with a classification of the plurality of game soundtracks. The classification of each of the plurality of game soundtracks and the classification of the one or more replacement soundtracks may be determined by a machine learning system trained based on historical user data stored in the historical data database.

The game soundtracks may be classified by extracting audio parameters of the game soundtracks and classifying the game soundtracks based on the audio parameters. The classification of the game soundtracks can be further based on the following feedback collected during the gameplay of the user: a current emotional state of the user, a current stress level of the user, a current emotional state of the gameplay, and so forth. The current emotional state of the user can be determined by capturing images of a user facial expression with a video camera; determining, based on the images, whether the user is blinking and how tense the user looks; and the like. The feedback may be analyzed using the machine learning system. Alternatively, the current emotional state of the user can be determined by recognizing a speech of the user or by analyzing in-game user actions. The current stress level of the user can be identified based on user vital parameters or user motions. For example, keystroke dynamics, user body temperature, user heart pulse, user in-game actions, and other parameters can be analyzed to detect the current stress level of the user. The vital parameters of the user may be measured using sensors of the electronic device of the user. Alternatively, external devices may be used to measure the vital parameters of the user. The current emotional state of the gameplay can be determined based on an analysis of a text content of the game. Speech and text recognition techniques may be used to perform the analysis of the current stress level and the current emotional state of the user.

It should be noted that the same game soundtrack may have multiple different classifications over time. For example, the first five seconds of the game soundtrack may be mellow, the next ten seconds may be aggressive, etc. Therefore, the classifying of the game soundtrack may include classifying the portions of the game soundtrack. Similarly, the replacement soundtrack also may be classified by classifying the portions of the replacement soundtrack.

In an example embodiment, matching the classification of the replacement soundtrack with the classification of the game soundtrack may include matching an aggressive segment of the replacement soundtrack with an aggressive segment of the game soundtrack. Matching BPM and fading in and fading out of the soundtracks may be used to facilitate a smooth transition of the replacement soundtrack. Additionally, multiple portions of the game soundtrack may be replaced with a single portion of the replacement soundtrack. Alternatively, a single portion of the game soundtrack may be replaced with multiple portions of the replacement soundtrack.

In a further example embodiment, when the game loops (i.e., when the user attempts to complete a level of the game and fails several times), the modified game music data may be different for each attempt of the user. In other words, different replacement soundtracks may be used for each attempt of the user to complete the level in the game. The replacement soundtracks in the second and further attempts of the user may be selected based on the feedback collected during the first attempt and the current attempt.

Generally, the machine learning system (or neural network) can employ one or more layers, including an input layer, an output layer, and one or more hidden layers. At each layer (except the input layer), an input value is transformed in a non-linear manner to generate a new representation of the input value. The output of each hidden layer can be used as an input to the next layer in the network, i.e., the next hidden layer or the output layer. Each layer of the network generates an output from a received input in accordance with current values of a respective set of parameters. The machine learning system can be trained (learned) based on historical user data to improve accuracy of the determination of the classification. The historical user data can include data characterizing previous successful and failed attempts of the classification.

At operation 320, the game music data may be dynamically modified while the user is playing the video game. The modification may be performed by replacing at least one of the plurality of game soundtracks with the one or more replacement soundtracks to obtain modified game music data.

The method 300 may further include identifying sound triggers based on a gameplay of the video game, actions of the user in the video game, or actions of further users in the video game. The replacement of the at least one of the plurality of game soundtracks with the one or more replacement soundtracks may be performed at times associated with the sound triggers. Alternatively, the replacement of the game soundtracks can be performed upon identifying certain actions of the user in the game or actions of other users in the game.

Additionally, the method 300 may include searching in the historical data database for one or more users having parameters similar to parameters of the user. Based on the search, one or more game soundtracks recommended or preferred by the one or more users may be selected. The dynamic modification of the game music data may further include replacing at least one of the plurality of game soundtracks with the one or more game soundtracks recommended or preferred by the one or more users.

At operation 325, the modified game music data may be provided to the user while the user is playing the video game. The modified game music data may include the one or more game soundtracks and the one or more replacement soundtracks. It should be noted that operations 305-335 are performed "on the fly" such that the replacement of the game soundtrack with the replacement soundtrack is performed dynamically and selectively during the gameplay.

Optionally, an identifier of the one or more replacement soundtracks used to replace the at least one of the plurality of game soundtrack may be temporarily displayed within the video game at operation 330. In an example embodiment, the identifier may include the pop-up showing at least a title of a song provided to the user in the modified game music data. In an example embodiment, the identifier may include several fields, such as a name of the soundtrack currently playing, a recent history of soundtracks, a "thumbs up" button and a "thumbs down" button to enable the user to show whether the user likes or dislikes the soundtrack, a button to enable/disable pop-ups to show the title of a new soundtrack, and the like. In some embodiments, the pop-up may be intelligently adjusted based on the current gameplay of the user. Specifically, some of the fields of the pop-up may be removed or added during the gameplay, or the pop-up may be displayed selectively. For example, if the soundtrack was already played several times during the gameplay, the pop-up may not be displayed for this soundtrack. If a new soundtrack is playing which was not heard by the user, the pop-up may be displayed to the user. If the user has already liked the soundtrack, the "thumbs up" button and the "thumbs down" button may not be displayed in the pop-up.

Upon providing the modified game music data to the user, the feedback associated with the gameplay of the user is continuously collected in order to further dynamically modify the modified game music data currently played in the game based on the feedback.

In an example embodiment, statistical data associated with the modified game music data may be collected. The user may have access to the statistical data to see soundtracks that were played when the user played the game, soundtracks the user liked, soundtracks that were played in multiple games of the user by virtue of the soundtracks being tagged by the user, soundtracks that were reconfirmed by the user as preferable, soundtracks that were double tagged (i.e., liked or disliked several times) by the user, and the like.

Based on the statistical data, a recommendation service can be provided. Specifically, the soundtracks played in the games the user played may be recommended to other users based on the correlation of the taste of the other users and the taste of the user (i.e., when the other users have taste similar to the user's taste). The similar tastes may be determined based on similar games played by the user and the other users, similar music preferred by the user and the other users, and so forth.

Moreover, when the user subsequently plays the same game, modified game music data may differ from the modified game music data provided to the user during the first time the user played the game, because different replacement soundtracks may be selected for modifying the game music data. The replacement soundtracks may be selected based on the feedback collected during the previous gameplay and current gameplay of the user. The feedback in the current gameplay may be different in view of a different emotional state of the user, different game results, different stress level of the user, and so forth, during that current gameplay. Therefore, the user may gain different game experience when playing the same game next time.

Figure 4:
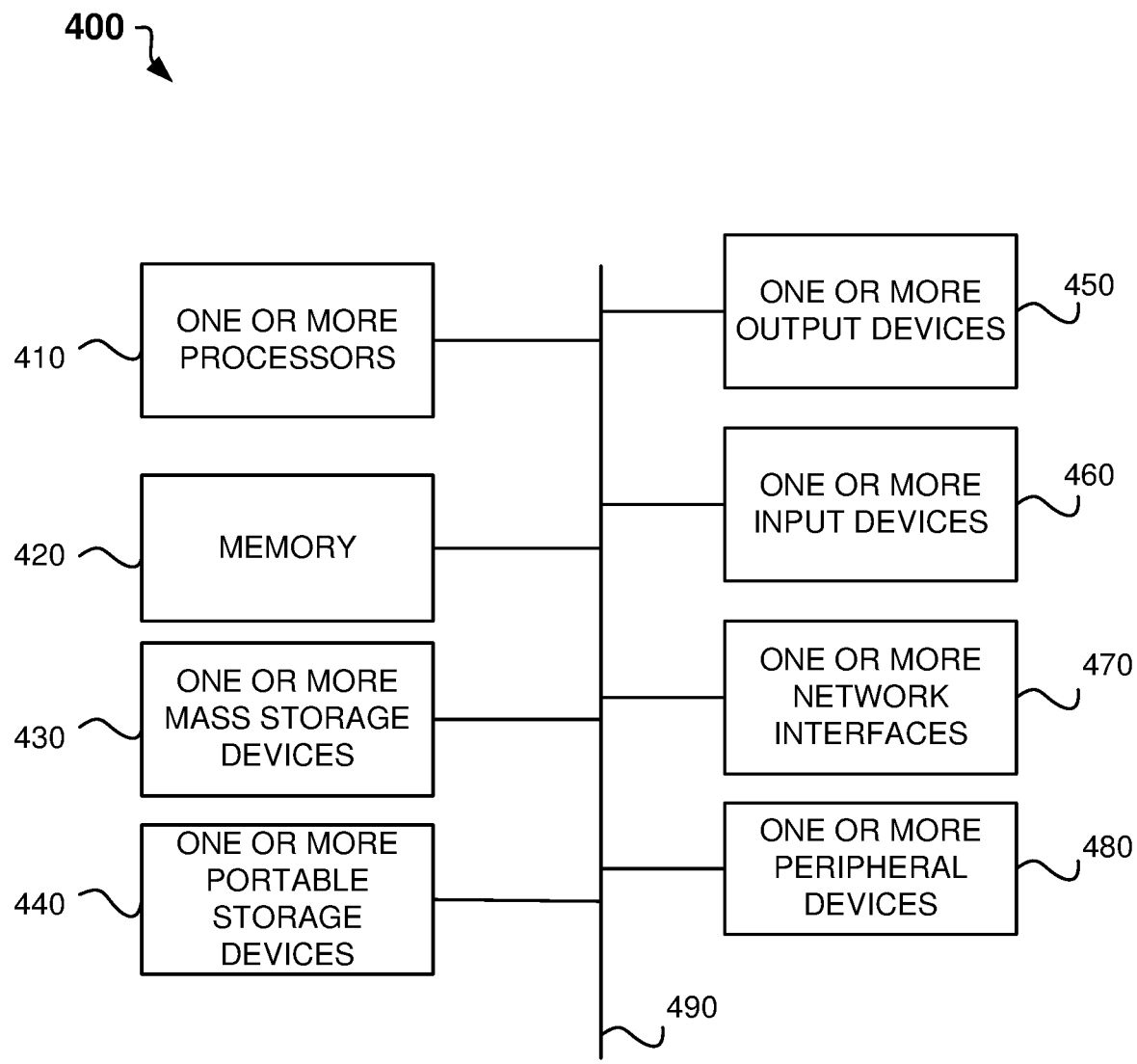
FIG. 4 shows an example computer system that can be used to implement at least some operations of a method for dynamically modifying audio playback of a video game, according to an example embodiment.

FIG. 4 is a high-level block diagram illustrating a computing device 400 suitable for implementing the methods for dynamically modifying audio playback of a video game as described herein. Computing device 400 may include, be, or be an integral part of one or more of a variety of types of devices, such as a game console, among others. In some embodiments, computing device 400 can be regarded as an instance of electronic device 105.

As shown in FIG. 4, a computing device 400 includes one or more processors 410, memory 420, one or more mass storage devices 430, one or more portable storage devices 440, one or more output devices 450, one or more input devices 460, one or more network interfaces 470, one or more optional peripheral devices 480, and a communication bus 490 for operatively interconnecting the above-listed elements. The one or more processors 410 can be configured to implement functionality and/or process instructions for execution within the computing device 400. For example, the one or more processors 410 may process instructions stored in memory 420 or instructions stored on the one or more mass storage devices 430. Such instructions may include components of an operating system or software applications.

The memory 420 may be configured to store information within the computing device 400 during operation. The memory 420, in some example embodiments, may refer to a non-transitory computer-readable storage medium or a computer-readable storage device. In some examples, the memory 420 is a temporary memory, meaning that a primary purpose of the memory 420 may not be long-term storage. The memory 420 may also refer to a volatile memory, meaning that the memory 420 does not maintain stored contents when the memory 420 is not receiving power. Examples of volatile memories include RAM, dynamic RAM, static RAM, and other forms of volatile memories known in the art. In some examples, the memory 420 is used to store program instructions for execution by the one or more processors 410. The memory 420, in one example, is used by software applications or mobile applications. Generally, software or mobile applications refer to software applications suitable for implementing at least some operations of the methods as described herein.

The one or more mass storage devices 430 can also include one or more transitory or non-transitory computer-readable storage media or computer-readable storage devices. For example, the memory 420 can store instructions for the one or more processors 410, user music library, game applications, game music, user settings, and so forth. In some embodiments, the one or more mass storage devices 430 may be configured to store greater amounts of information than the memory 420. The one or more mass storage devices 430 may also be configured for long-term storage of information. In some examples, the one or more mass storage devices 430 include non-volatile storage elements. Examples of such non-volatile storage elements include magnetic hard discs, optical discs, solid-state discs, flash memories, forms of electrically programmable memories (electrically programmable ROMs) or electrically erasable and programmable memories, and other forms of non-volatile memories known in the art.

The computing device 400 may also include one or more input devices 460. The one or more input devices 460 may be configured to receive input from a player through tactile, audio, video, or biometric channels. Examples of the one or more input devices 460 may include a keyboard, keypad, mouse, trackball, touchscreen, touchpad, microphone, video camera, image sensor, fingerprint sensor, or any other device capable of detecting an input from the player or other source, and relaying the input to the computing device 400 or components thereof.

The one or more output devices 450 may be configured to provide output to the player through visual or auditory channels. The one or more output devices 450 may include a video graphics adapter card, display, such as liquid crystal display monitor, light emitting diode (LED) monitor, or organic LED monitor, sound card, speaker, headphones, headset, virtual reality headset, projector, or any other device capable of generating output that may be intelligible to a player. The one or more output devices 450 may also include a touchscreen, presence-sensitive display, or other input/output capable displays known in the art.

The computing device 400 can also include one or more network interfaces 470. The one or more network interfaces 470 can be utilized to communicate with external devices via one or more communications networks such as a communications network or any other wired, wireless, or optical networks. The one or more network interfaces 470 may be a network interface card, such as an Ethernet card, an optical transceiver, a radio frequency transceiver, or any other type of device that can send and receive information.

An operating system of the computing device 400 may control one or more functionalities of the computing device 400 or components thereof. For example, the operating system may interact with the software applications or mobile applications and may facilitate one or more interactions between the software/mobile applications and the one or more processors 410, memory 420, the one or more mass storage devices 430, the one or more input devices 460, the one or more output devices 450, and the one or more network interfaces 470. The operating system may interact with or be otherwise coupled to software applications or components thereof. In some embodiments, software or mobile applications may be included in the operating system.

Thus, methods and systems for dynamically modifying audio playback of a video game have been described. Although embodiments have been described with reference to specific example embodiments, it will be evident that various modifications and changes can be made to these example embodiments without departing from the broader spirit and scope of the disclosed application. Accordingly, the specification and drawings are to be regarded in an illustrative rather than a restrictive sense.

What is claimed is:

1. A system for dynamically modifying audio playback of a video game, the system comprising:
   a processor configured to:
      while a user is playing a particular video game:
         ascertain game music data associated with a particular video game, the game music data including a plurality of game soundtracks classified according to predetermined criteria;
         collect feedback over a period of time while the user is playing the video game, the feedback including at least data associated with a performance of the user in the particular video game;
         based on the feedback, dynamically modify the game music data by replacing in real-time at least one of the plurality of game soundtracks with one or more replacement soundtracks to obtain modified game music data; and
         provide the modified game music data to the user; and
      an analyzing unit configured to determine, based on the feedback, the one or more replacement soundtracks based on criteria associated with the one or more replacement soundtracks.

2. The system of claim 1, wherein the feedback further includes one or more of the following: an express action of the user, evaluation of game results, an emotional state of the user, and an input of the user, the input including at least one of a tactile input, an audio input, a video input, and a biometric input.

3. The system of claim 2, wherein the emotional state of the user includes one or more of the following: a biometrical response, a facial expression, a facial motion, and a stress level.

4. The system of claim 2, wherein the express action includes one or more of the following: pressing a "like" button, pressing a "thumbs up" button, pressing a "thumbs down" button, enabling a pop-up, the pop-up showing at least a title of a song provided to the user in the modified game music data, and disabling the pop-up.

5. The system of claim 4, wherein the processor is further configured to:
   access a music source, the music source including the one or more replacement soundtracks; and
   wherein the analyzing unit is further configured to:
   determine audio parameters for each of the one or more replacement soundtracks;
   classify the one or more replacement soundtracks based on the audio parameters; and
   index the one or more replacement soundtracks based on the classifying to provide replacement soundtrack indexes, wherein the replacement soundtrack indexes are used to match a classification of the one or more replacement soundtracks with a classification of the plurality of game soundtracks.

6. The system of claim 5, wherein the classification of each of the plurality of game soundtracks and the classification of the one or more replacement soundtracks is determined by a machine-learning system; and
   wherein the machine-learning system is trained based on historical user data stored in a historical data database.

7. The system of claim 5, wherein the audio parameters include a beats-per-minute value, a tonality value, a pitch value, a timbre value, a harmonics value, a loudness value, a rhythm value, a sound envelope, a music genre, a release date, and an emotional classification.

8. The system of claim 2, wherein the emotional state of the user is determined based on a voice of the user.

9. A method for dynamically modifying audio playback of a video game, the method comprising:
   while a user is playing a particular video game:
      ascertaining game music data associated with a particular video game, the game music data including a plurality of game soundtracks classified according to predetermined criteria;
      collecting feedback, the feedback including at least data associated with a performance of the user in the particular video game;
      based on the feedback, determining one or more replacement soundtracks based on criteria associated with the one or more replacement soundtracks;
      dynamically modifying the game music data by replacing in real-time at least one of the plurality of game soundtracks with the one or more replacement soundtracks to obtain modified game music data; and
      providing the modified game music data to the user.

10. The method of claim 9, further comprising storing the feedback to a historical data database, the historical data database storing a plurality of feedbacks associated with a plurality of users collected while each of the plurality of users is playing the particular video game.

11. The method of claim 9, wherein the feedback further includes one or more of the following: an express action of the user, evaluation of game results, an emotional state of the user, and an input of the user, the input including at least one of a tactile input, an audio input, a video input, and a biometric input.

12. The method of claim 11, wherein the emotional state of the user includes one or more of the following: a biometrical response, a facial expression, a facial motion, and a stress level.

13. The method of claim 12, further comprising identifying the stress level of the user based on user vital parameters or user motions.

14. The method of claim 11, wherein the express action includes one or more of the following: pressing a "like" button, pressing a "thumbs up" button, pressing a "thumbs down" button, enabling a pop-up, the pop-up showing at least a title of a song provided to the user in the modified game music data, and disabling the pop-up.

15. The method of claim 11, wherein the emotional state of the user is determined based on a voice of the user.

16. The method of claim 9, further comprising:
   searching in a historical data database for one or more users having parameters similar to parameters of the user; and
   selecting one or more game soundtracks recommended or preferred by the one or more users;
   wherein the dynamic modifying of the game music data further includes replacing at least one of the plurality of game soundtracks with the one or more game soundtracks recommended or preferred by the one or more users.

17. The method of claim 9, further comprising:
   accessing a music source, the music source including the one or more replacement soundtracks;
   determining audio parameters for each of the one or more replacement soundtracks;
   classifying the one or more replacement soundtracks based on the audio parameters; and
   indexing the one or more replacement soundtracks based on the classifying to provide replacement soundtrack indexes, wherein the replacement soundtrack indexes are used to match a classification of the one or more replacement soundtracks with a classification of the plurality of game soundtracks.

18. The method of claim 17, wherein the classification of each of the plurality of game soundtracks and the classification of the one or more replacement soundtracks is determined by a machine-learning system; and
   wherein the machine-learning system is trained based on historical user data stored in the historical data database.

19. The method of claim 17, wherein the audio parameters include a beats-per-minute value, a tonality value, a pitch value, a timbre value, a harmonics value, a loudness value, a rhythm value, a sound envelope, a music genre, a release date, and an emotional classification.

20. The method of claim 9, further comprising identifying sound triggers based on a gameplay of the particular video game, actions of the user in the particular video game, or actions of further users in the particular video game, wherein the replacement of the at least one of the plurality game soundtracks with the one or more replacement soundtracks is performed at times associated with the sound triggers.

21. The method of claim 9, further comprising temporarily displaying, within the particular video game, an identifier of the one or more replacement soundtracks used to replace the at least one of the plurality of game soundtracks.

22. A non-transitory processor-readable medium having instructions stored thereon, which when executed by one or more processors, cause the one or more processors to implement a method for dynamically modifying audio playback of a video game, the method comprising:
   while a user is playing a particular video game:
      ascertaining game music data associated with a particular video game, the game music data including a plurality of game soundtracks classified according to predetermined criteria;
      collecting feedback, the feedback including at least data associated with a performance of the user in the particular video game;
      based on the feedback, determining one or more replacement soundtracks based on criteria associated with the one or more replacement soundtracks;
      dynamically modifying the game music data while the user is playing the particular video game by replacing in real-time at least one of the plurality of game soundtracks with the one or more replacement soundtracks to obtain modified game music data; and
      providing the modified game music data to the user while the user is playing the particular video game.

* * * * *